US008842888B2

(12) United States Patent
Pritikin et al.

(10) Patent No.: US 8,842,888 B2
(45) Date of Patent: Sep. 23, 2014

(54) USER INTERFACE FOR COMBINED BIOMETRIC MOBILE DEVICE

(75) Inventors: Joseph Justin Pritikin, Mountain View, CA (US); Jonathan J. Ureña, San Jose, CA (US); Fenling Chou, Cupertino, CA (US); Sylvia Siu, Palo Alto, CA (US); Keara Fallon, San Francisco, CA (US)

(73) Assignee: AOptix Technologies, Inc., Campbell, CA (US)

( * ) Notice: Subject to any disclaimer, the term of this patent is extended or adjusted under 35 U.S.C. 154(b) by 179 days.

(21) Appl. No.: 13/525,153

(22) Filed: Jun. 15, 2012

(65) Prior Publication Data

US 2013/0336545 A1     Dec. 19, 2013

(51) Int. Cl.
*G06K 9/00*     (2006.01)

(52) U.S. Cl.
USPC ............................. 382/116; 382/117; 382/124

(58) Field of Classification Search
None
See application file for complete search history.

(56) References Cited

U.S. PATENT DOCUMENTS

| | | | | |
|---|---|---|---|---|
| 6,753,919 B1* | 6/2004 | Daugman | ...................... | 348/345 |
| 7,369,759 B2* | 5/2008 | Kusakari et al. | ................ | 396/18 |
| 8,385,611 B2* | 2/2013 | Shinzaki | ........................ | 382/124 |
| 8,587,711 B2* | 11/2013 | Anderson | ................ | 348/333.07 |
| 2001/0026632 A1* | 10/2001 | Tamai | ............................ | 382/116 |
| 2002/0091937 A1* | 7/2002 | Ortiz | .............................. | 713/200 |
| 2005/0270386 A1* | 12/2005 | Saitoh et al. | ................... | 348/239 |
| 2006/0023919 A1* | 2/2006 | Okamura et al. | ............. | 382/115 |
| 2006/0029262 A1* | 2/2006 | Fujimatsu et al. | ............. | 382/117 |
| 2006/0104224 A1* | 5/2006 | Singh et al. | .................... | 370/310 |
| 2010/0021017 A1 | 1/2010 | Bell et al. | | |
| 2011/0222745 A1 | 9/2011 | Osterhout et al. | | |
| 2012/0102332 A1 | 4/2012 | Mullin | | |
| 2012/0127179 A1* | 5/2012 | Aspelin | ......................... | 345/441 |
| 2012/0148115 A1 | 6/2012 | Birdwell et al. | | |
| 2012/0246079 A1* | 9/2012 | Wilson et al. | ................... | 705/67 |

FOREIGN PATENT DOCUMENTS

EP     2 299 693 A1     3/2011
WO     WO 2006/136876 A1     12/2006

OTHER PUBLICATIONS

PCT International Search Report and Written Opinion, PCT Application No. PCT/US2013/041217, Jan. 22, 2014, ten pages.

* cited by examiner

*Primary Examiner* — Daniel Mariam
(74) *Attorney, Agent, or Firm* — Fenwick & West LLP

(57) ABSTRACT

A mobile device is able to capture a plurality of different biometric identifiers of a subject. The mobile device displays a user interface on a screen of the device to guide the user in the capture of valid biometric identifiers. The user interface includes several different displays configured to guide users through the capture process to improve the chance that the user will capture valid biometric identifiers. The user interface includes displays for iris image capture, face image capture, voice capture, and fingerprint capture. The displays streamline the capture process, decreasing the overall knowledge and time required of the user to capture valid biometric identifiers. This also decreases the risk to the user in hostile environments. The device also processes the captured biometric identifiers to determine if they are valid, and updates the display of the user interface accordingly.

15 Claims, 14 Drawing Sheets

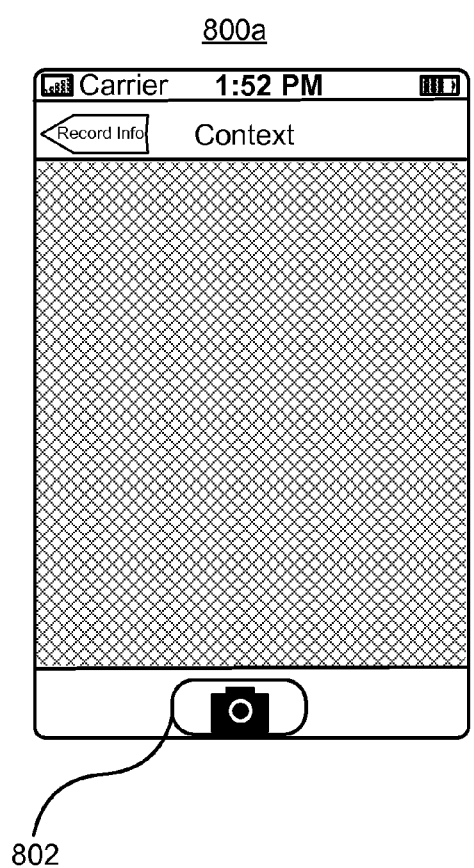
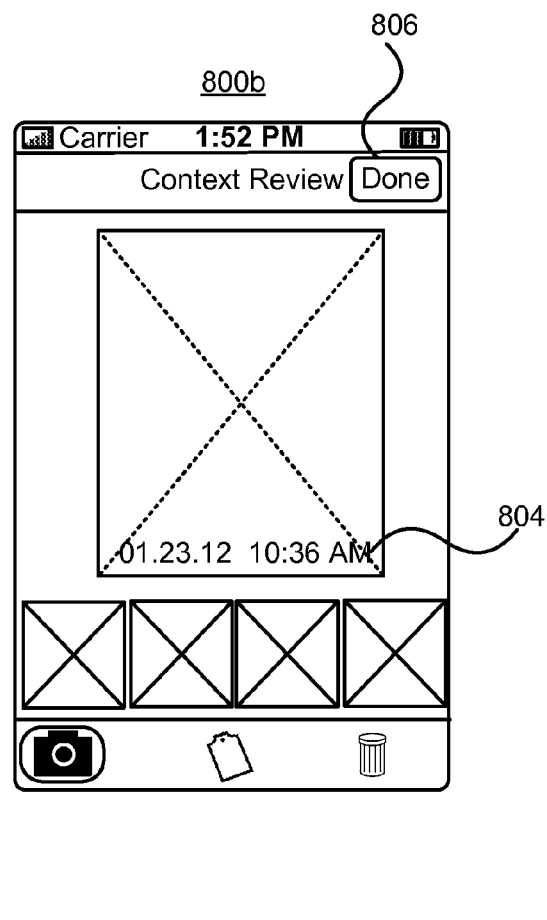
FIG. 8A
FIG. 8B

USER INTERFACE FOR COMBINED BIOMETRIC MOBILE DEVICE

BACKGROUND OF THE INVENTION

1. Field of the Invention

This application relates generally to user interfaces, and particularly to user interfaces for portable biometric identification systems.

2. Description of the Related Arts

Biometric systems allow for the identification of human subjects using human traits that are either unique to each subject or are sufficiently uncommon so that one or more traits can be used to narrow down the number of possible subjects matching those traits. There are a number of different kinds of traits that may be used in biometric identification including, for example, iris images, face images, fingerprints, and recordings of a subject's voice. Traits captured in some form for use in biometric identification may be referred to generally as biometric identifiers.

However, capture of biometric identifiers is a difficult task. Each type of biometric identifier captured needs to be of sufficient quality that it can be used to narrow down the number of possible subjects matching the corresponding trait. A biometric identifier of sufficient quality may also be referred to as a "valid" biometric identifier. If the biometric identifier is of insufficient quality, it may not be possible to accurately or precisely determine whether the biometric identifier is associated with a given human subject. A poor quality biometric identifier may be entirely useless, or only of limited use in narrowing down the subjects matching the biometric identifier.

Systems configured for the capture of a biometric identifier will generally be designed for a specific manner of use that improves the chance of capture of a valid biometric identifier. Generally, a user of the system will follow a specific set of instructions designed to ensure the capture of a valid biometric identifier. For example, in the capture of fingerprints by paper and ink, the finger is usually rolled from one side to the other on the paper without repeating to avoid smudging. The paper includes instructions for the user to ensure that fingerprints captured are for the correct fingers with respect to the paper. For face images, the subject must look a particular direction and must be sufficiently still in order to capture all necessary facial features. For iris images, existing iris capture systems generally only work within a limited range of distance, under certain light conditions.

While in some cases the instructions for biometric capture are explained by text, often times the instructions are not written down and must be learned through training and experience. This increases the difficulty of capturing valid biometric identifiers. These requirements can be particularly onerous if the user is working in a hostile environment (e.g., in the working environments of the police or military) where subject cooperation is difficult to obtain. In these circumstances, the more difficult the biometric identifier capture process is, the greater the risk of personal harm to the user.

SUMMARY OF THE INVENTION

A mobile device is able to capture a plurality of different biometric identifiers of a subject. The mobile device displays a user interface on a screen of the device to guide the user in the capture of valid biometric identifiers. The user interface includes several different displays configured to guide users through the capture process to improve the chance that the user will capture valid biometric identifiers. The user interface includes displays for iris image capture, face image capture, voice capture, and fingerprint capture. The displays streamline the capture process, decreasing the overall knowledge and time required of the user to capture valid biometric identifiers. This also decreases the risk to the user in hostile environments. The device also processes the captured biometric identifiers to determine if they are valid, and updates the display of the user interface accordingly.

The user interface also includes displays for the capture of biographical information of a subject. Together the biographical information and biometric identifiers may be collected into a subject profile. Subject profiles may be used to enroll subjects in a database of subject profiles for later use. Subject profiles may also be compared against the database of subject profiles to determine the identity of a subject or to validate the subject for authorized access. For the use case of identification, the user interface includes displays for viewing the subject profiles that match a captured subject profile submitted for identification.

In addition to the user interface and a screen, the mobile device also includes one or more input devices to receive input from the user. The mobile device also includes subsystems configured to capture biometric identifiers. For example, the mobile device includes a fingerprint capture subsystem to capture fingerprints, one or more imaging subsystem to capture face images and iris images, and a microphone to capture voice recordings.

BRIEF DESCRIPTION OF THE DRAWINGS

The teachings of the embodiments of the present invention can be readily understood by considering the following detailed description in conjunction with the accompanying drawings.

FIGS. 8A-B are displays of a user interface for capturing the immediate surroundings of the subject for use as a contextual identifier, according to one embodiment.

DETAILED DESCRIPTION OF EMBODIMENTS

Mobile Device Overview

Figures 1A, 1B:
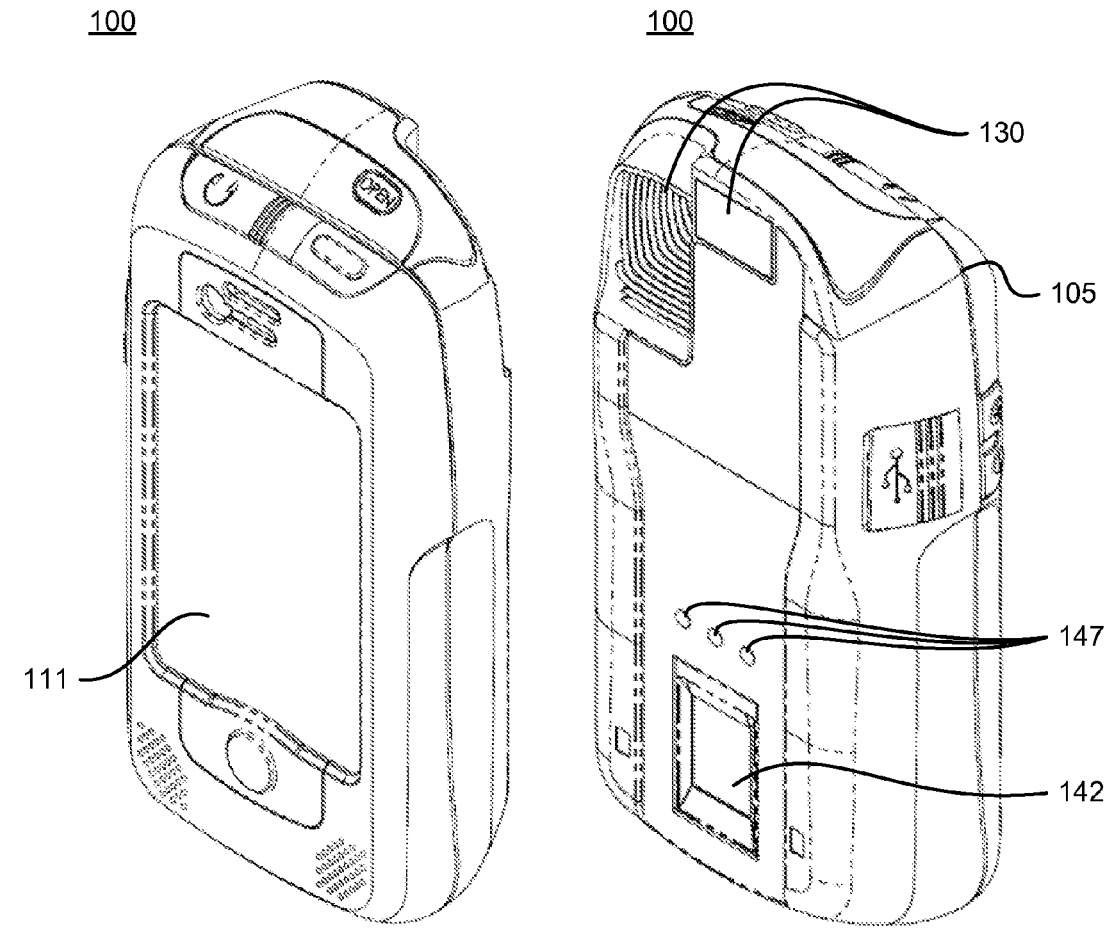
FIGS. 1A and 1B illustrate a portable, handheld mobile device for biometric identifier capture, according to one embodiment.
Figure 1C:
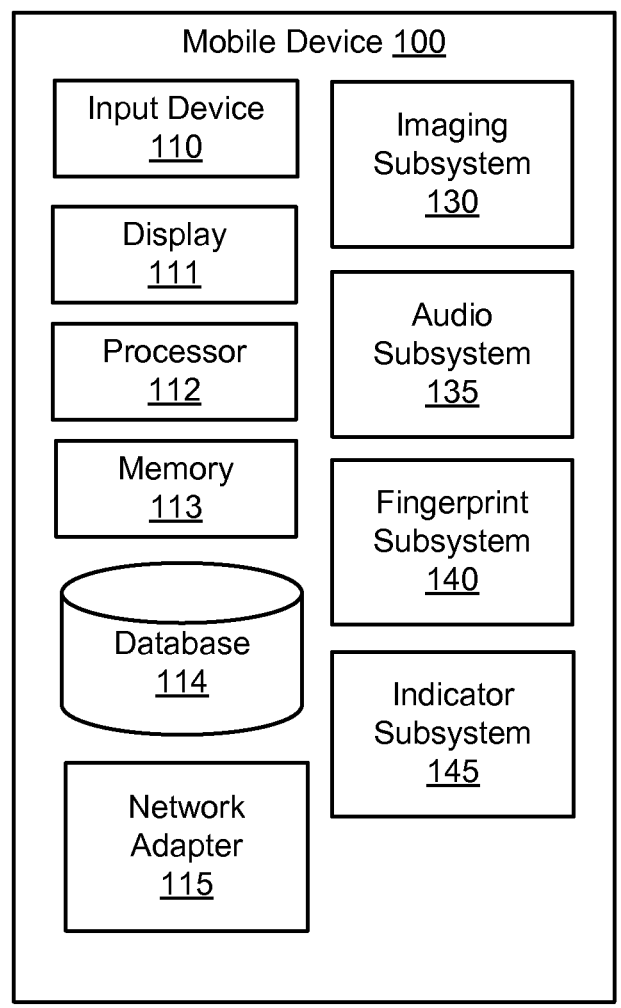
FIG. 1C is a block diagram of a mobile device, according to one embodiment.

FIGS. 1A and 1B illustrate a portable, handheld mobile device 100 for biometric identifier capture, according to one embodiment. FIG. 1C is a block diagram of the components of a mobile device 100, according to one embodiment. The mobile device 100 is configured to display a user interface on a display 111 to guide a user in operating the device 100 to capture biometric identifiers including, for example, face images, iris images, fingerprints, and voice recordings.

In the example shown in FIGS. 1A-B, the mobile device 100 includes a smartphone (not explicitly labeled) enclosed within an enclosure 105. In various implementations of the mobile device 100, the components of the mobile device 100 may reside either in the enclosure 105 or in the smartphone. For clarity of description, all components will be referenced with respect to the mobile device 100 generally. Specifically, components 111, 130, 142 and 147 illustrated in FIGS. 1A-B will be described in the context of the components of the mobile device 100 illustrated in FIG. 1C. As illustrated in FIG. 1C, the components of the mobile device 100 include an input device 110, a display 111, a processor 112, a memory 113, a database 114, a network adapter 115, an imaging subsystem 130, an audio subsystem 135, a fingerprint subsystem 140, and an indicator subsystem 145.

In one embodiment the input device 110, the display 111, the processor 112, the memory 113, the database 114, and the network adapter 115 are all standard computing components. Other standard computing components necessary for the operation of the mobile device 100 and known to those of skill in the art may also be present in the mobile device 100, for example a global positioning system, compass, and/or magnetometer for location determination, etc., but are omitted herein in order to avoid obscuring the invention. The computing components shown in FIG. 1C are briefly described below.

The input device 110 allows a user to input information into the mobile device 100. The input device 110 may include a physical keyboard or keypad, a mouse, a touch sensitive screen provided in conjunction with display 111, or any number of other input devices. The input device 110 is used to input biographical information for the profile of a subject. The input device 110 is also used to navigate between different displays of the user interface.

The display 111 displays the user interface. As input is received to the mobile device 100 from the user or subject, the user interface is updated. The user interface may also update in response to the capture and processing of biometric identifiers by the mobile device 100, and in response to material received externally through network adapter 115. The display 111 may be a touch sensitive screen that is part of the input device 110.

The processor 112 executes computer-readable program instructions for the operation of the mobile device 100 as a whole. The processor 112 may also execute instructions for the operation of the various subsystems 130, 135, 140 and 145 of the mobile device 100, as described in more detail below, and for the display of the user interface on the display 111. Furthermore, the processor 112 may be implemented as a single processor or may be implemented by employing multiple processors for increased computing capability.

The memory 113 may store the computer-readable program instructions for execution by the processor 112. The memory 113 may also store data on a temporary or permanent basis for convenient access by the processor 112.

The database 114 persistently stores, in a non-transitory manner, information for the mobile device 100. Particularly, the database 114 stores subject profiles including a subject's biographical information as well as their captured biometric identifiers. The database 114 may also be used as part of an access or identification system that makes use of stored subject profiles. Database 114 may include, but is not limited to, any type of disk magnetic-optical disks, read-only memories (ROMs), random access memories (RAMs), EPROMs, EEPROMs, magnetic or optical cards, application specific integrated circuits (ASICs), field programmable gate arrays (FPGAs), or any type of media suitable for storing electronic instructions.

A network adapter 115 allows the mobile device 100 to communicate with external devices. The network adapter 115 allows the database 114 to communicate with external systems to send, retrieve, and synchronize subject profiles with a remote database (not shown).

The imaging subsystem 130 allows the mobile device 100 to capture face and iris images for use as face and iris biometric identifiers, respectively. The imaging subsystem 130 may include one or more cameras, as well as additional optical, computing, and sensing subsystems configured to carry out iris and face image captures. An example of suitable imaging subsystems is described in U.S. patent application Ser. No. 13/453,151, which is incorporated herein by reference in its entirety.

The audio subsystem 135 allows the mobile device 100 to capture a voice recording of a subject for use as a voice biometric identifier. The audio subsystem 135 includes a microphone for this purpose. The audio subsystem 135 also includes one or more audio speakers for playing audio recordings. The speakers may be used to play back voice biometric identifiers stored in the database 114. The speakers may be also used to provide the user or subject with instructions for the use of the device 100, as well as to provide indications of the status and use of the device 100.

The fingerprint subsystem 140 includes a fingerprint scanner 142 (shown in FIG. 1B) to capture fingerprints of a subject for use as fingerprint biometric identifiers. In order to keep the mobile device 100 of sufficiently small size, the fingerprint scanner 142 may be located on a different side of the mobile device 110 from the display 111, as illustrated in FIGS. 1A and 1B. Particularly, if the mobile device 100 includes an enclosure 105 enclosing a smartphone as illustrated in FIG. 1B, positioning the fingerprint scanner 142 on the opposite side of the device 100 from the display 111 helps reduce the overall size of the mobile device 100.

The indicator subsystem 145 provides information and instruction regarding the status and use of the mobile device 100. The indicator subsystem 145 may be configured to indicate different states based on the status of device 100. Examples of such states include a ready to capture state for when the fingerprint scanner 142 is ready to capture a fingerprint of a subject, a capturing state for when the fingerprint scanner 142 is actively capturing a fingerprint, a processing state for when the mobile device 100 is processing a received fingerprint to determine whether it is valid, a valid fingerprint state indicating that a recently captured fingerprint is valid for use as a biometric identifier, and an invalid state indicating that a recently captured fingerprint is invalid and should be recaptured.

The indicator subsystem 145 may include one or more lights 147 where the activation of the lights 147 may be varied to indicate the various states. For example, the color of a light 147, the number of lights 147 active, the time a light 147 is active, the periodicity with which a light 147 is active, and the intensity of a light 147 all represents aspects of the activation which may be combined in various combinations to indicate the various states. Alternatively, the indicator subsystem 145 may include the audio speaker from the audio subsystem 135, where the speaker is configured to play back a different recorded sound for each state.

In one embodiment, the lights 147 of the indicator subsystem 145 are positioned on the mobile device 100 to be concurrently visible with the fingerprint scanner (or fingerprint sensor) 142. Although the user interface is configured to display whether a fingerprint has been validly captured, the position of the fingerprint scanner 142 on a different side of the mobile device 100 from the display 111 (to reduce the overall size of the mobile device 100) can make it more difficult for a user to ensure that each fingerprint has been validly captured (e.g., by flipping over the device after each fingerprint capture to view the display 111). Constant repositioning of the mobile device 100 to switch between presentation of the fingerprint scanner 142 to the subject and presentation of the display 111 would otherwise decreases the efficacy and efficiency of the mobile device 100. Accordingly, positioning the lights 147 to be concurrently visible with the fingerprint scanner 142 allows the indicator subsystem 145 to be used to confirm the valid capture of a fingerprint without needing to refer to the display 111.

The mobile device 100 is also capable of determining whether input it has captured is valid for use as a biometric identifier. Although each type of biometric identifier is different, generally, the device 100 compares the captured input against a quality metric to determine if it is sufficient for use in biometric identification. The quality metric may be based on a statistical correlation of various quality factors to the biometric performance of a database of similar identifiers. The quality metric may also incorporate comparing the captured input to a database of identifiers to determine whether the captured input is sufficient. The captured input may also be compared to an International Organization for Standardization (ISO) quality criterion. An ISO quality criterion may be incorporated into the quality metric.

Displays of the User Interface on the Mobile Device

Figures 2A, 2B:
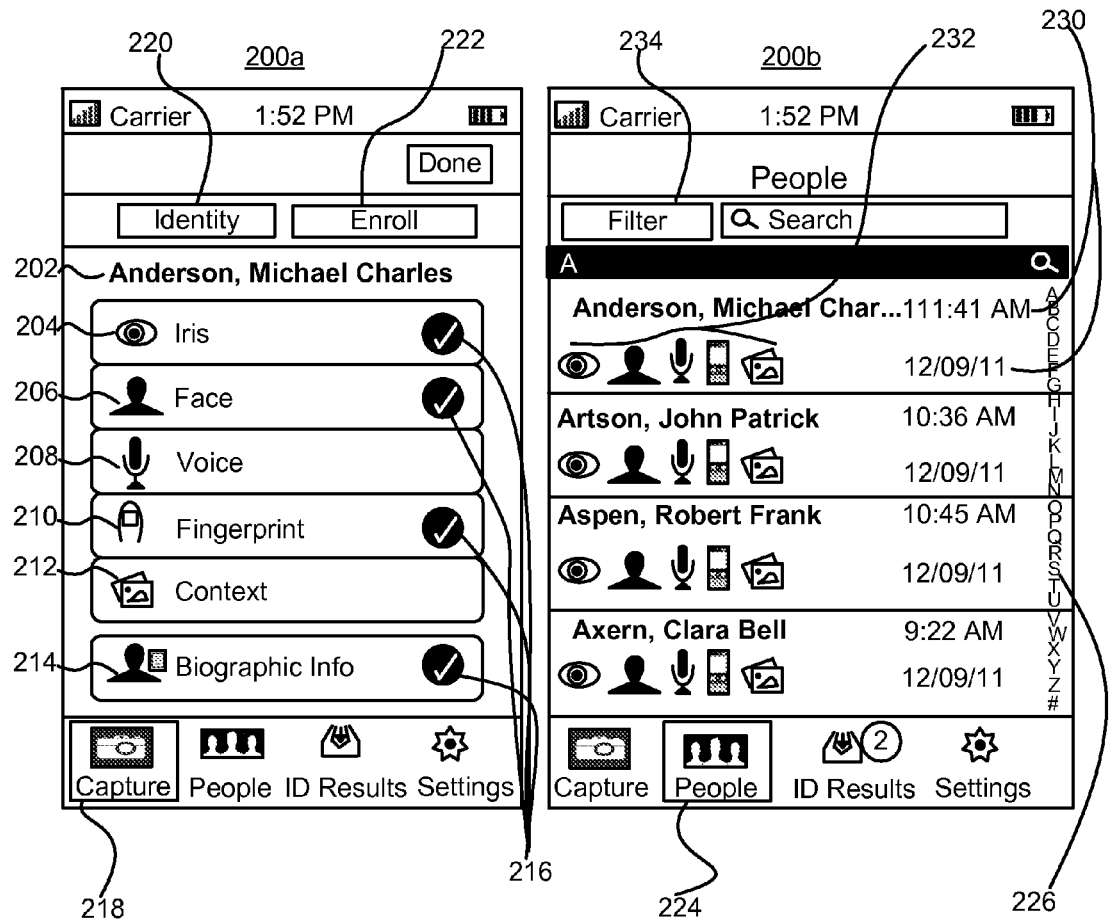
FIGS. 2A and 2B are displays of a user interface to view, create, and edit subject profiles, according to one embodiment.

FIGS. 2A and 2B are displays of a user interface to view, create, and edit subject profiles, according to one embodiment. FIG. 2A is a display of a user interface 200a summarizing which portions of a single subject profile have been created and stored, and which portions have not. The display is part of the capture 218 process for the general creation of a subject profile, but also applies to the editing and viewing of an already existing subject profile. The user interface includes a name of a subject 202, and lists the various biometric identifiers that may be captured by the mobile device including, for example, an iris biometric identifier 204, a face biometric identifier 206, a voice biometric identifier 208, a fingerprint biometric identifier 210, and a context biometric identifier 214. For each biometric identifier, a capture status 216 is displayed if that biometric identifier has already been validly captured for that subject's profile.

The user interface also indicates whether biographical input 214 has been entered for the subject. A capture status 216 indicates if biographical information sufficient to create a subject profile has already been input.

The user interface 200a allows the user to choose whether a subject profile is being created for the purpose of enrolling 222 the subject into a system including a database of subject profiles, or whether the subject profile is being created for the purpose of comparing the subject profile against an existing database of subject profiles (e.g., for identification 220 or access (not shown)).

FIG. 2B is a display of a user interface 200b for listing subject profiles, which in one embodiment is accessed by selecting the people icon 224. If a user input is received selecting an individual subject profile, for example by touching one of the profiles displayed on a touch sensitive display 111, the user interface transitions to displaying the portion of the user interface illustrated in FIG. 2A. The listing of subject profiles may be sorted alphabetically by first or last name, or according to another metric such as time of creation 230 or time of last edit 230 of each subject profile. Along with each listed subject profile, icons 232 illustrate which biometric identifiers have been captured for that subject profile. This provides a user with an easy way to determine which biometric identifiers have been captured for which subjects without needing to individually view each subject profile. The list of subject profiles may be filtered 234 by subject name, biometric identifiers captured, and creation or edit date of subject profiles. If the list extends longer than the size of the screen of the mobile device 100, a scroll input may be received to update which profiles in the list are displayed by the user interface 200b, or the user may select an initial letter corresponding to the name associated with a desired profile from the alphabet 226 to jump directly to profiles filed under that letter.

Figure 3:
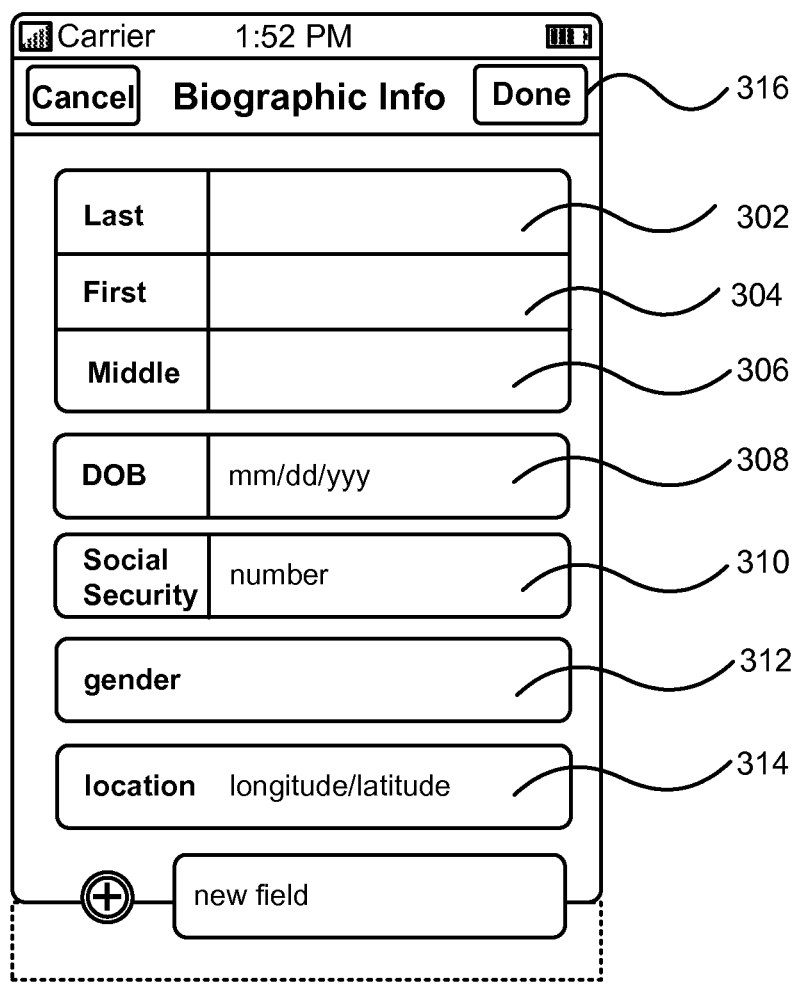
FIG. 3 is a display of a user interface for receiving biographical input for a subject, according to one embodiment.

FIG. 3 is a display of a user interface 300 for receiving biographical input for a subject, according to one embodiment. Examples of information the user interface is configured receive include a subject's last name 302, first name 304, middle name 306, date of birth 308, social security number 310, gender 312, geographical location in the real world 314 where the subject profile was created or updated, passport number (not shown), and a state identification or driver's license number (not shown).

To create a subject profile, generally at least some biographical information is needed to distinguish between different subject profiles for the convenience of the user. Which biographical information is required and which is optional may vary based on the implementation of the system. For example, last names may be required while all else is optional, or alternatively social security number may be required and all else optional. As long as all required biographical information is received for a subject, the capture status 216 on the subject's profile on the capture portion of the user interface 200a illustrated in FIG. 2A will indicate that the biographical information has been captured. In another implementation, no biographical information is required to create a subject profile.

Figure 4A:
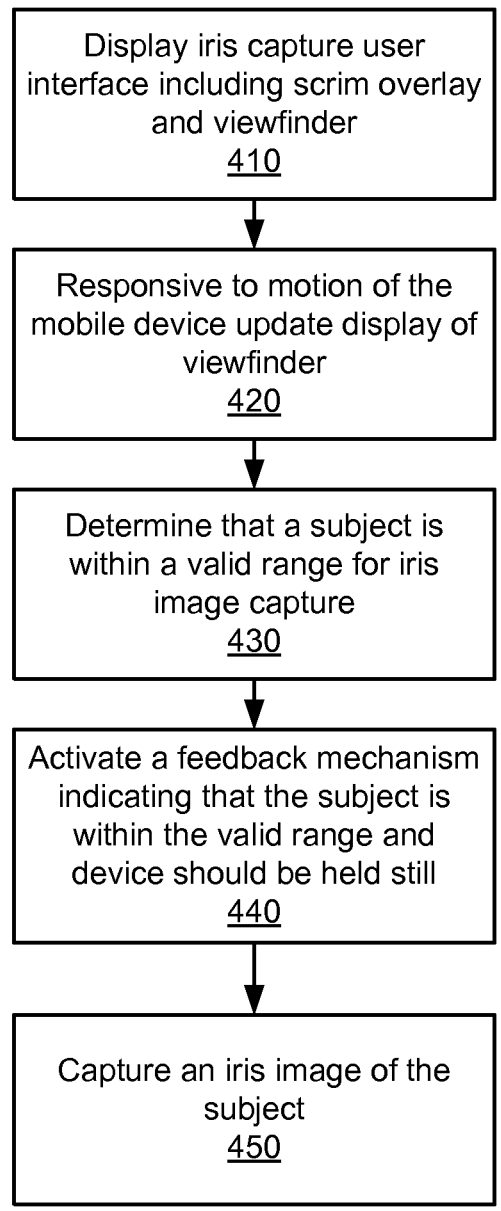
FIG. 4A is flowchart for the capture of an iris image, according to one embodiment.

FIG. 4A is flowchart for the capture of an iris image, according to one embodiment. The process described in the flowchart is carried out by the mobile device 100 in conjunction with the displays of the user interface illustrated in FIGS. 4B-F. FIGS. 4B-F are displays of a user interface for capturing an iris image, according to one embodiment.

The mobile device 100 displays 410 an iris capture user interface 400 on the display 111. The user interface displays an image (not explicitly shown or labeled) from a video feed. The image may be displayed using the entirety of the display 111, or using only a portion. The video feed is a series of images captured using the imaging subsystem 130. The image displayed is constantly updated with a new image from the video. Thus, the user interface displays a near real time video feed of what is "seen" by the imaging subsystem 130 that will be performing the iris image capture.

As illustrated in FIGS. 4B-E, the user interface also includes a scrim overlay 462 covering a majority of the displayed image. The scrim overlay 462 surrounds a iris region 464. The scrim overlay 462 is a graphical effect that partially visually obstructs (or obscures) the displayed image. While it is possible for a user looking at the display 111 to make out the image displayed through the scrim overlay 462, the image is not as clear as it would be if not obstructed. For example, the scrim overlay 462 may partially grey or black out the image.

In contrast, in the iris region 464 the displayed image is not visually obstructed. The iris region 464 is of a shape that is a wider than it is tall, where the width of the iris region 464 is oriented along an axis perpendicular to the vertical height of the subject. The purpose of the iris region 464 is to provide a convenient visual guide for how the mobile device 100 should be positioned with respect to the subject for proper iris image capture. The shape of the iris region 464 is configured to encompass at least both irises of a subject as captured by the imaging subsystem 130. Both irises of a subject will fit within the iris region 464 where the subject and the mobile device 100 are separated by a range of distances where the imaging subsystem 130 is able to capture a valid iris image.

Thus, the user interface including the scrim overlay 462, image, and iris region 464 internalizes some of the requirements of the imaging subsystem 130 for capturing valid iris images, thereby minimizing the proficiency required to use the mobile device 100. Additionally, these components of the user interface also serve to provide a clear targeting mechanism even in brightly sunlit conditions, where visibility of the display 111 is decreased in comparison to indoor conditions, for example.

It is possible that despite moving the mobile device 100 so that the subject's irises fit within the iris region 464, that the distance between the mobile device 100 and the subject is still not within the proper range for valid iris image capture. This may be, for example, due to variation in the inter-pupillary distance between subjects. In order to guide the user in correctly positioning the device 100 for iris image capture, the iris capture user interface also includes a viewfinder 466. The viewfinder 466 is a graphical element overlaid on the scrim overlay 464 and the image in the iris region 464. The viewfinder 466 is graphically reconfigurable based on the relative position (e.g., distance) between the mobile device 100 and the subject. The implementation of the viewfinder 466 may vary. Generally, the viewfinder is one or more shapes or lines of varying sizes, colors, and/or patterns. The size, shape, color, and/or pattern of the viewfinder changes depending upon the distance between the mobile device 100 and the subject.

The mobile device 100 updates the display of the viewfinder 466 responsive to receiving or detecting a motion 420 indicating a change in the relative position between the mobile device 100 and the subject. By adjusting the display of the viewfinder 466, the user is visually guided as to how the mobile device may be correctly positioned so that valid iris images may be captured.

Figure 4B:
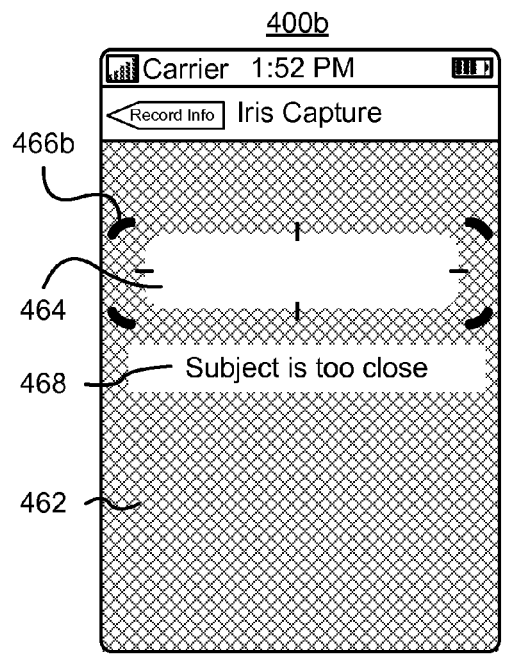
FIGS. 4B-F are displays of a user interface for capturing an iris image, according to one embodiment.
Figure 4C:
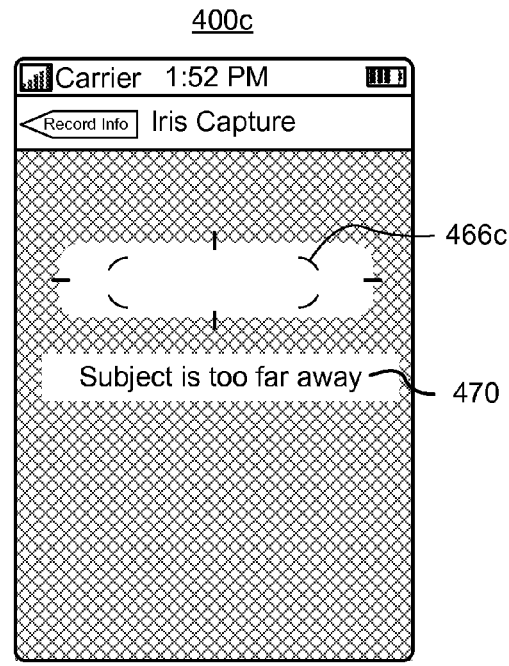
Figure 4D:
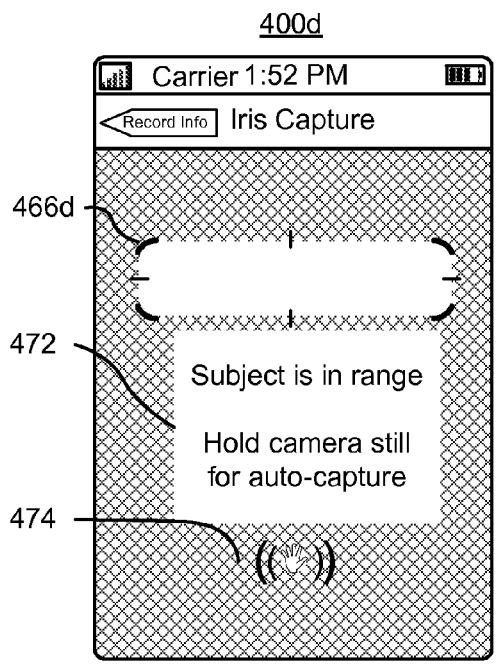

In the implementation of the viewfinder illustrated in FIGS. 4B-D, the viewfinder 466 is a reticle comprising a plurality of lines with varying thicknesses. The lines are oriented on a plurality of opposing sides (or corners) of the iris region 464. In a first case as illustrated by FIG. 4B, if the distance between the mobile device 100 and the subject is too small for iris image capture, the lines of the viewfinder 466b are displayed with increased thickness, covering a greater portion of the image than in other cases. Further, the lines of the viewfinder 466b are each displayed further away from each other than in other cases. In this example case, the lines of the viewfinder 466b are displayed over the scrim overlay 462 and not the iris region 464. In addition to the viewfinder 466b, a text explanation 468 is also displayed indicating that the subject is too close to the mobile device 100. An audio explanation played through the speakers of the mobile device 100 may also reinforce the text explanation 468. In another implementation, only the position of the lines of the viewfinder 466 is changed based on distance, rather than both the thickness and position being changed.

In a second case as illustrated by FIG. 4C, if the distance between the mobile device 100 and the subject is too small for iris image capture, the lines of the viewfinder 466c are displayed with decreased thickness, covering a smaller portion of the image than in other cases. Further, the lines of the viewfinder 466c are each displayed closer to each other than in other cases. In this example, the lines of the viewfinder 466c are displayed over the iris region 464 and not the scrim overlay 462. In addition to the viewfinder 466c, a text explanation 470 is also displayed indicating that the subject is too far from the mobile device.

In a third case as illustrated by FIG. 4D, the mobile device 100 determines 430 that the distance between the subject and the mobile device is within a range for valid iris image capture. In this case, the lines of the viewfinder 466d are displayed with a thickness intermediate between the sizes of the first two cases above. Further, the lines of the viewfinder 466d are displayed close to or overlaying the border between the iris region 464 and the scrim overlay 462. To notify the user that the range is valid, a text explanation 472 and/or a graphical explanation 474 are also displayed indicating that the subject is within a valid range for iris image capture.

In practice, there may be instances where the subject is misaligned with respect to the mobile device 100, such that the subject's irises are not within the iris region 464. For example, the subject may be positioned with respect to the mobile device 100 such that the subject's irises appear to the left, right, above, or below the iris region 464. In addition to guiding the user with respect to the correct distance between the subject and the mobile device 100, the viewfinder 466 is also configured to provide a visual guide (not shown) for how the mobile device 100 may be repositioned (or aligned) so that the subject's irises fall within the iris region 464. For example, the viewfinder may be reconfigured to display arrows indicating the direction the mobile device 100 should be reposition in order to align the subject's irises with the iris region 464.

In order to capture a valid iris image, the mobile device 100 must remain still to within a tolerance. Otherwise, the imaging subsystem 130 may not be able to capture a valid iris image. The imaging subsystem's tolerance for motion will vary depending upon the implementation. Passive and active motion stabilization subsystems may be used to increase the device's tolerance for motion. To minimize motion of the mobile device 100, the user interface is further configured to notify the user that the mobile device 100 should be held as still as possible. The text 472 and/or graphic 474 explanations may also be used for this purpose.

To further assist in notifying the user that the device 100 should be held still for iris image capture, the device 100 activates 440 a feedback subsystem (not shown) configured to provide audio or physical feedback to the user. In the case of audio feedback, the feedback subsystem may be the audio subsystem 135. The audio subsystem 135 is configured to play a sound through a speaker indicating that the device 100 should be held steady for iris image capture. In the case of physical feedback, the feedback subsystem includes a vibration subsystem (not shown), such as a weighted motor. Activation of the vibration subsystem indicates that that the device 100 should be held steady for iris image capture.

Figure 4E:
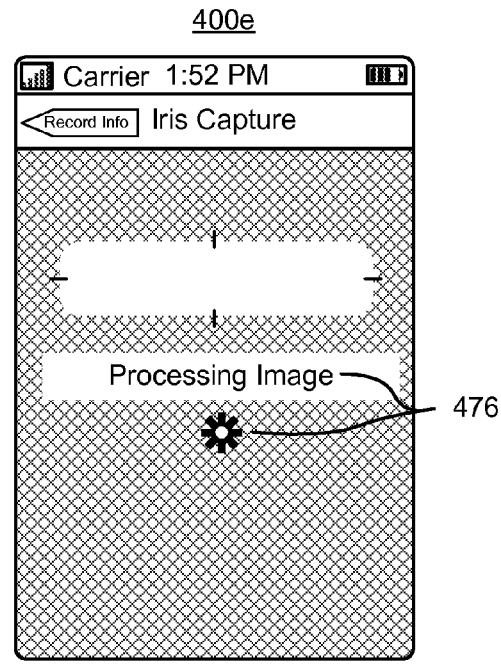

Assuming the subject is within a valid range from the mobile device and that the device 100 is sufficiently still, the imaging subsystem 130 captures 450 an iris image of the subject. Once an iris image has been captured, the device processes the image to determine if it is valid. FIG. 4E is an example display of the user interface while device 100 is processing the image.

Figure 4F:
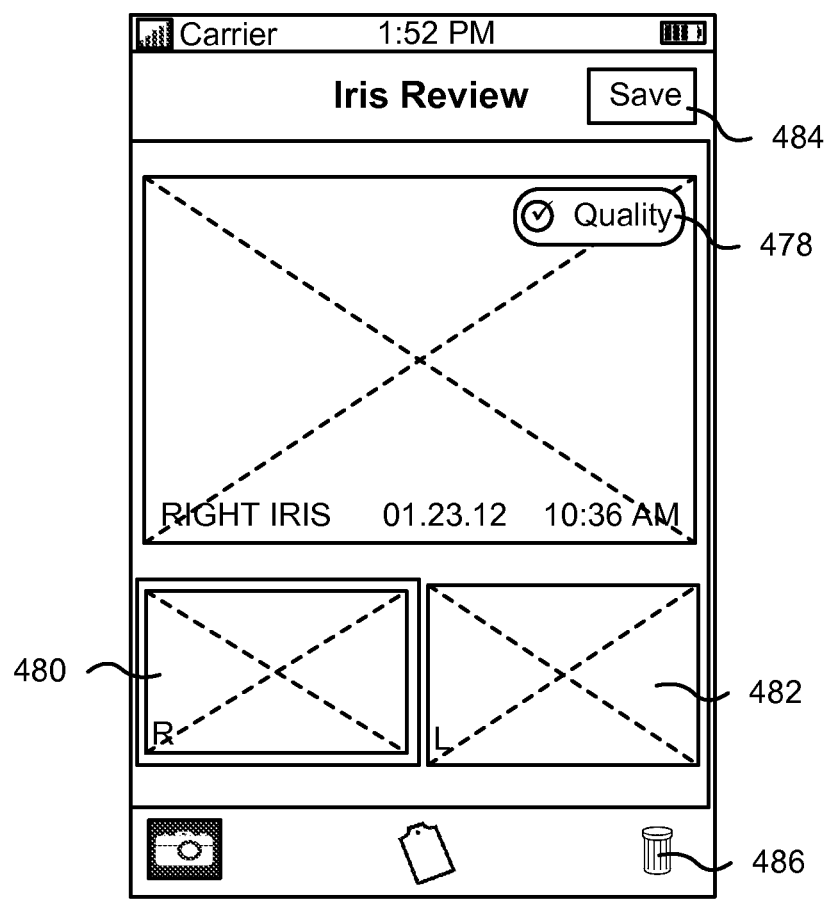

Once iris images have been captured by the device 100 for the subject, the user interface 400f provides a display for reviewing the captured images, as illustrated in FIG. 4F. A validity graphical element 478 illustrates whether each iris image is valid. The user interface further allows the user to switch between separate smaller and larger views of the right 480 and left 482 iris images. The user interface also provides the user with the option of saving 484 valid iris images to part of the subject profile. The user interface also provides the user with option of restarting the iris capture process 486.

Figure 5A:
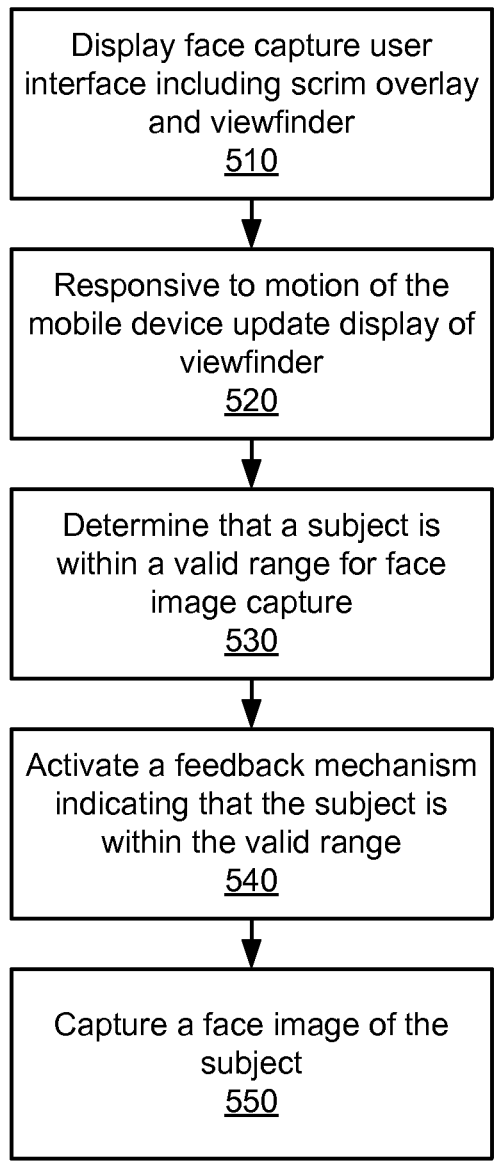
FIG. 5A is flowchart for the capture of a face image, according to one embodiment.

FIG. 5A is flowchart for the capture of a face image, according to one embodiment. The process described in the flowchart is carried out by the mobile device in conjunction with the displays of the user interface illustrated in FIGS. 5B-E. FIGS. 5B-E are displays of a user interface for capturing an face image, according to one embodiment.

The process for the capture of face images is similar to the process for the capture of iris images. The face capture user interface is similar to the iris capture user interface. As a result, for brevity and clarity some details in the description of the face capture case are not re-described here, and can instead be found in the section above on iris capture. One advantage of having the processes and user interfaces for face and iris capture be as similar as possible is to decrease the difficulty for the user in learning to use the mobile device 100 for capturing biometric identifiers.

A face capture user interface is displayed 510 on the screen of the mobile device 100. The user interface includes a scrim overlay 562 surrounding a face region 564, and a viewfinder 566. These aspects of the user interface function similarly to the scrim overlay 462, iris region 464, and viewfinder 466, respectively, of the iris capture user interface.

As with the scrim overlay 462, the scrim overlay 562 surrounds the face region 464. However, the face region 564 is shaped differently than the iris region 464. The face region 464 is sufficiently large in size so that when the distance between the mobile device 100 and the subject is within a valid range for the capture of a face image that may be used as a biometric identifier, the face region encompasses the entirety of the face of the subject. The shape of the face region 464 may vary depending upon the implementation. In the example of FIGS. 5B-5E, the face region 464 is oval shaped, but it may also be circular, rectangular, or any other shape.

As with scrim overlay 462, the scrim overlay 562 is configured to partially visually obstructs an image from a video feed captured by the imaging subsystem 130 that are displayed on the display 111. Also as above, the face region 564 does not visually obstruct the displayed image. Thus, as above, the face capture user interface provides the user with a preview of what the imaging subsystem 130 will capture when capturing a face image.

Figure 5B:
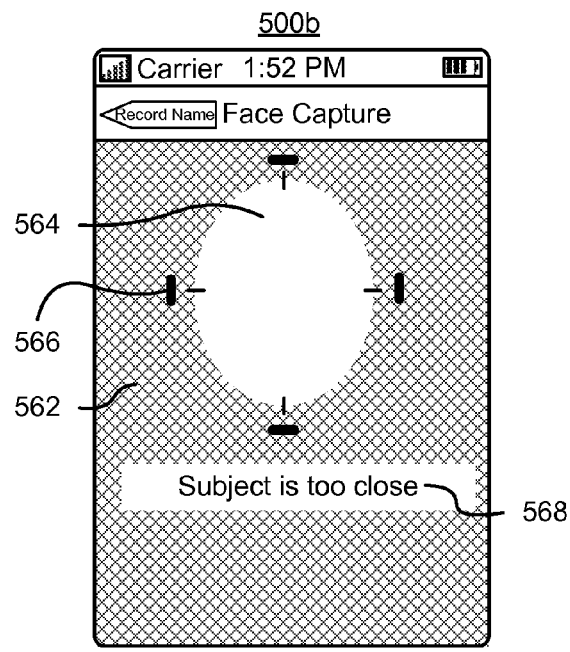
FIGS. 5B-E are displays of a user interface for capturing a face image, according to one embodiment.
Figure 5C:
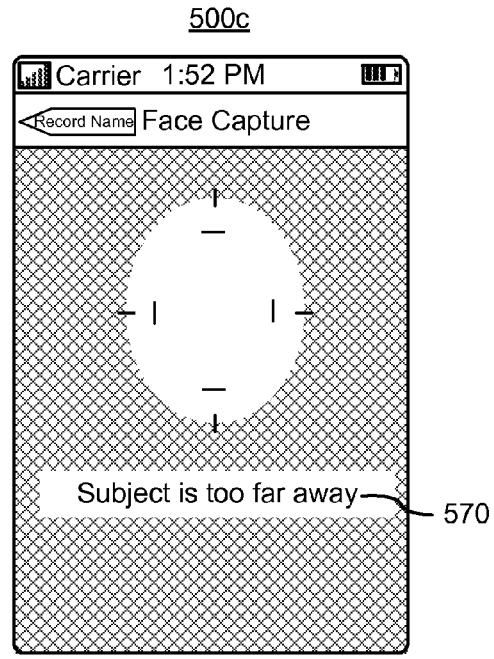

As with the viewfinder 464, viewfinder 566 provides the user with visual feedback regarding how the mobile device 100 may be positioned with respect to the subject in order to capture a valid face image for use as a biometric identifier. Responsive to a motion 520 of the mobile device 100, the viewfinder 566 is graphically reconfigured similarly to viewfinder 466 as the distance between the mobile device 100 and the subject changes. For example, as illustrated the viewfinder 566 may contract and appear smaller if the subject is too far from the device 100 as illustrated in FIG. 5C, and may expand and appear larger if the subject is too close to the device 100 as illustrated in FIG. 5B.

Figure 5D:
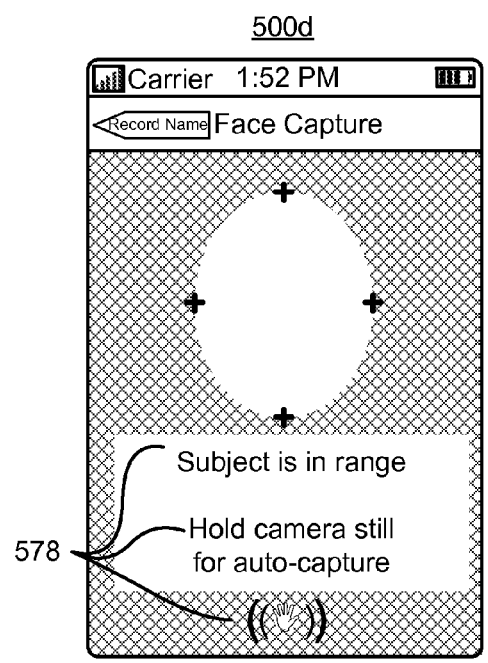

If the mobile device 100 determines 530 that the subject is within a valid range for face image capture as illustrated in FIG. 5D, the viewfinder 566 appears at an intermediate size in comparison to the "too far" and "too close" cases. For example, the viewfinder 566 may appear close to or on the border between the face region 564 and the scrim overlay 562. As with the iris capture case, the face capture user interface may also display graphical and/or text explanations 578 indicating that the mobile device 100 is correctly positioned for face image capture, and further indicating that the device 100 should be held still to improve the chance that a valid face image can be captured.

Figure 5E:
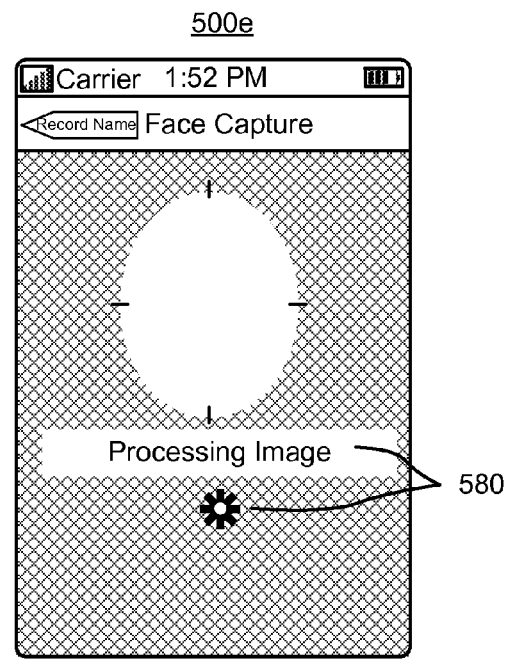

To provide further guidance to the user that the device 100 is a proper distance from the subject and that the device should be held still to capture a face image, the device 100 activates 540 a feedback mechanism (not shown). This may be the same feedback mechanism as is used for iris capture, or a different feedback mechanism. If the device 100 is held still, a face image of the subject is captured 550. The face image is processed to determined if it is valid for use as a biometric identifier. During processing, the user interface may be updated to display a text and/or graphical explanation 580 that processing ongoing, as illustrated in FIG. 5E.

As with the iris capture case, once processing is completed the user interface displays the captured face image for the user to review (not shown). The user interface also displays a graphical element indicating if it is valid for use as a biometric identifier, provides the user with an option to save the face image to the subject profile, and also allows the user to restart the face capture process.

Figure 6A:
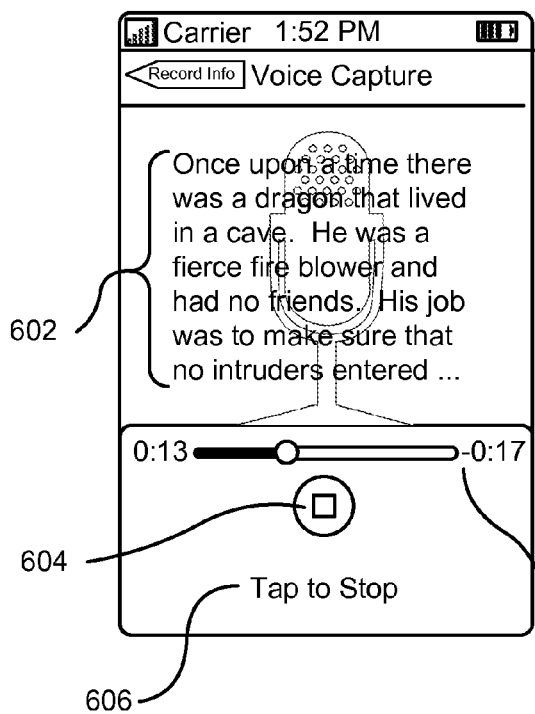
FIGS. 6A-B are displays of a user interface for capturing a voice recording, according to one embodiment.
Figure 6B:
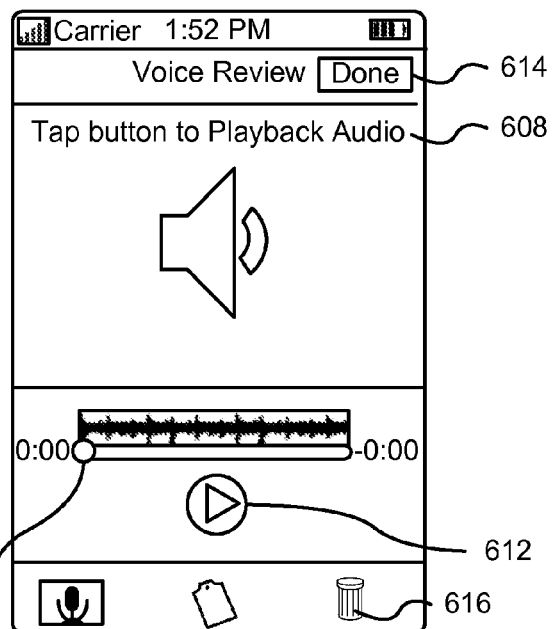

FIGS. 6A-B are displays of a user interface for capturing a voice recording, according to one embodiment. As illustrated in FIG. 6A, the voice capture user interface includes a recording button 604 that activates and deactivates voice capture. The recording button 604 interfaces with an audio subsystem 135 of the device 100 that includes a microphone. The recording button 604 controls the capture and storage of voice recordings by the mobile device 100.

To increase the chance that the device 100 captures a voice recording valid for use as a biometric identifier, the user interface displays a text prompt 602 to be read by the subject during voice recordation. This text prompt may be edited and may be different for each subject. The user interface also displays text instructions 606 for how the user and/or subject to follow to operate the device 100 to record the subject's voice. In one implementation, rather than providing a text prompt 602, the subject may instead be instructed to verbalize something known to the subject does not require prompting, for example their name, address, date of birth or other personal details.

As illustrated in FIG. 6B, once the subject's voice has been recorded, the user interface provides a display for the user with opportunity to review the voice recording. The user interfaces includes text instructions 608 to the subject regarding how the user interface may be manipulated to review the recording. A playback button 612 controls the playback of the voice recording through the speaker of the audio subsystem 135. A graphical element (not shown) indicates whether the voice recording is valid for use as a biometric identifier. The user interface includes an option 614 of saving the voice recording to the subject's profile. The user interface may also provide the option to restart the process for voice recordation 616. The user interface includes a progress indicator 610 during both recording and review to indicate how far into the voice recording the device 100 is during recording or playback.

Figure 7A:
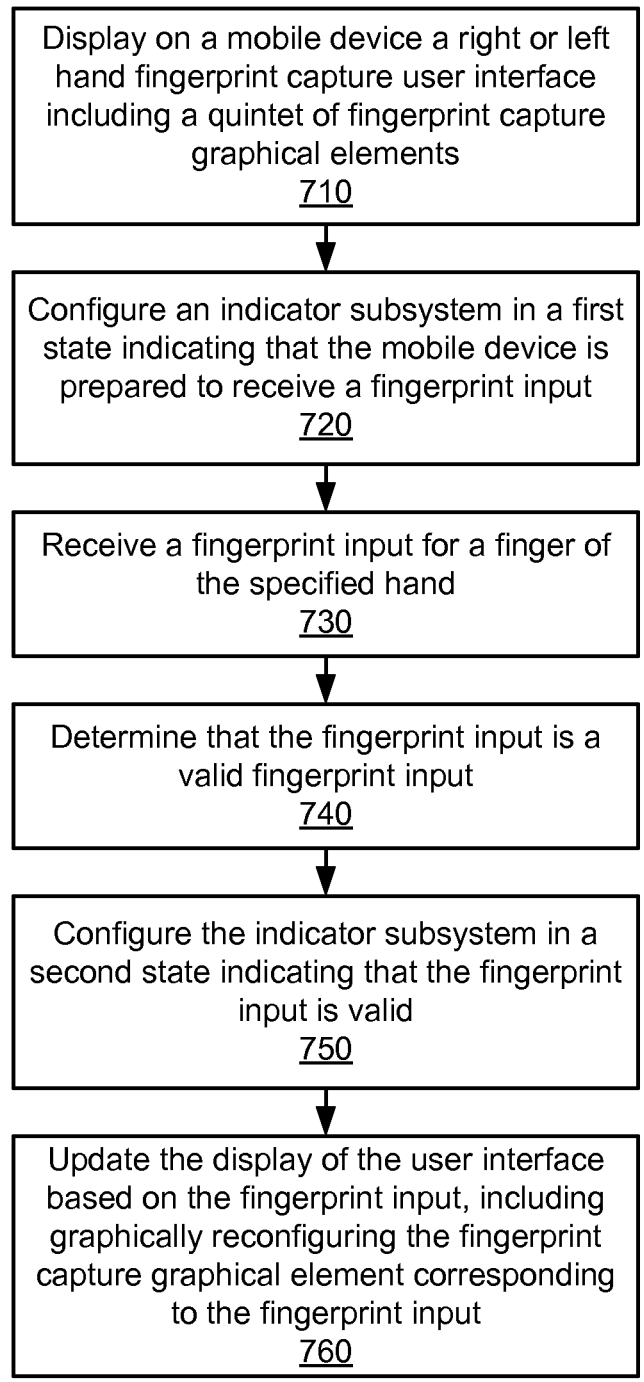
FIG. 7A is a flowchart for the capturing a fingerprint, according to one embodiment.

FIG. 7A is a flowchart for the capture of a fingerprint, according to one embodiment. The process described in the flowchart is carried out by the mobile device 100 in conjunction with the displays of the user interface illustrated in FIGS. 7B-E. FIGS. 7B-E are displays of a user interface for capturing fingerprints, according to one embodiment.

Figure 7B:
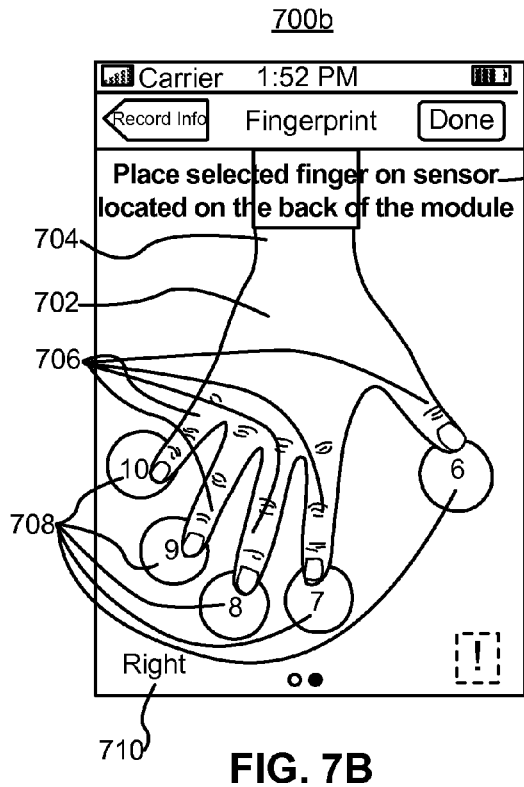
FIGS. 7B-E are displays of a user interface for capturing fingerprints, according to one embodiment.
Figure 7C:
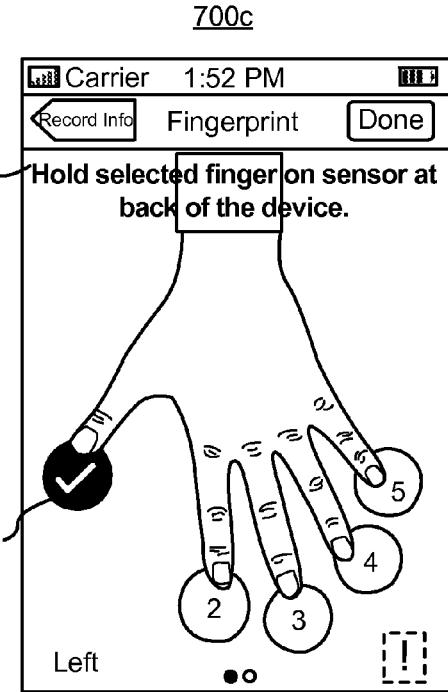

The mobile device 100 displays 710 a fingerprint capture user interface on the display 111. As illustrated in FIGS. 7B and 7C, the user interface 700b, 700c includes a graphical representation of a hand 702 to facilitate the capture of fingerprints for that hand. There are separate displays for the right and left hands. The graphical representation of the hand 702 includes at least a wrist or base of the hand 704, as well as a quintet of fingers including their fingertips 706. The user interface allows the capture of the fingerprints of the hand that is currently displayed by the user interface. The user interface further designates a user input (e.g., a swipe motion across a touch sensitive display 111) that allows the user to switch which hand is currently displayed by the user interface.

The graphical representation of the hand 702 is oriented so that the fingertips 706 are proximate to the bottom of the screen, and the wrist 704 is proximate to the top of the screen. In this orientation, when the mobile device is held up so that the display 111 of the device 100 faces towards the user with the back of the mobile device 100 facing towards the front of the subject, the graphical representations of the right and left hand will match the positioning of the right and left hands of the subject. By orienting the graphical representations 702 in this manner, the user interface reduces the possibility of confusion by the user with respect to which hand of the subject to use to capture fingerprints. The user interface may additionally include a text indication 710 of which hand is currently displayed for capture.

In one implementation, the user interface includes graphical representations of both the right and left hands simultaneously (not shown), and uses an indicator, in either graphical or text form (not shown) to highlight the hand of the subject for which the device 100 is currently configured to capture fingerprints.

Positioned in proximity to each fingertip of the graphical representation 702 is a fingerprint capture status graphical element 708. These graphical elements 708 are graphically reconfigurable to indicate whether or not a valid fingerprint for use as a biometric identifier has been captured for each finger on each hand of the subject. For example, a first graphic may be displayed as the graphical element 708 if a valid fingerprint has not yet been received, and a second graphic may be displayed as the graphical element 708 once a valid fingerprint has been received, as illustrated by element 708 in FIG. 7C. In some cases, capture of a fingerprint is not possible due to bandages or the lack of a fingerprint on a subject. In these instances, the graphical element 708 for a finger may indicate that capture of a fingerprint that is valid for use as a biometric fingerprint is not possible. The graphical elements 708 may additionally be graphically configured to indicate an order for the capture of fingerprints, and may be additionally graphically configured to indicate which fingerprints are required to be captured for use in a particular system.

Prior to the capture of a fingerprint, the indicator subsystem 145 is configured 720 to be in a ready to capture state indicating to the user that the mobile device 100 is prepared to receive a fingerprint input. The scanner 140 receives 730 a fingerprint input for a finger of the hand of the subject. The mobile device 100 processes the received fingerprint input to determine 740 whether or not it is valid for use as a biometric identifier. While the fingerprint input is being processed, the indicator subsystem 145 may be configured to be in a processing state indicating to the user that the input is being processed.

If the fingerprint is determined to not be valid, the indicator subsystem 145 is configured to be in an invalid state. The invalid input state informs the user that the input was invalid and that the subject needs to rescan their finger with the fingerprint scanner 142. Additionally, the user interface may display a similar indication on the display 111 of the device 100.

If the fingerprint is determined 740 to be valid, the indicator subsystem 145 is configured 750 to be in a valid fingerprint state. Additionally, the display of the user interface is updated 760 to indicate that the fingerprint was validly captured. Specifically, the fingerprint capture graphical element 708 corresponding to the captured fingerprint is updated. Thus, as the user proceeds through the capture of each fingerprint, the user interface provides a visual display of whether a new fingerprint has been captured validly or invalidly, as well as which fingerprints have already been validly captured and which are remaining to be captured.

Figure 7D:
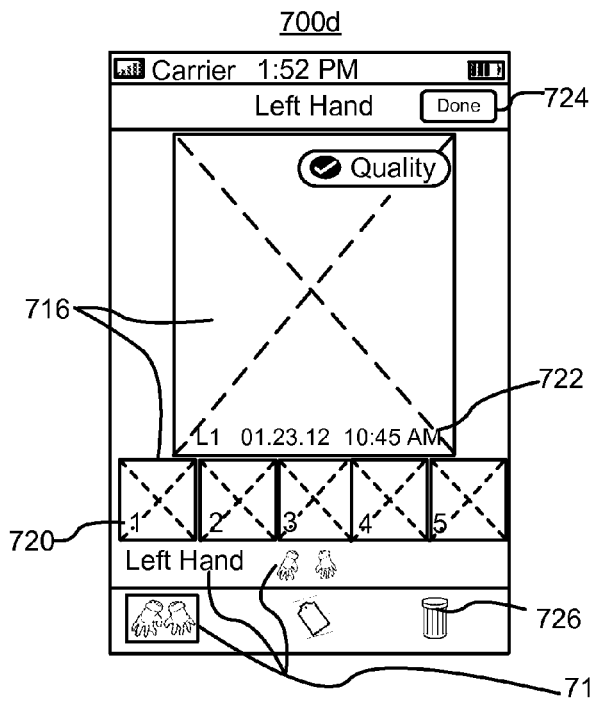
Figure 7E:
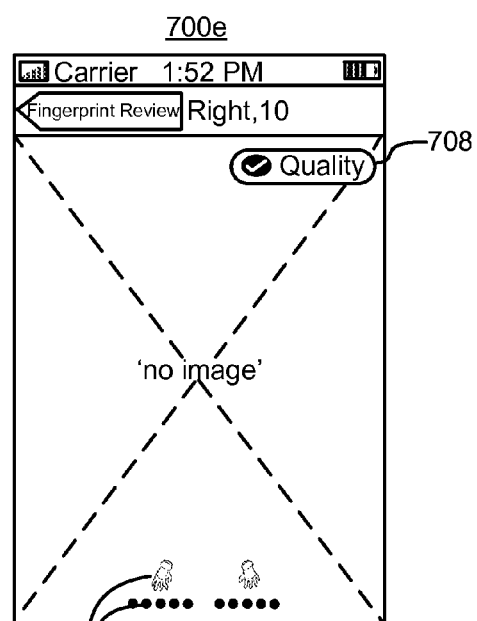

Upon capture of all of the fingerprints of one or both of the hands of the subject, the user interface 700d provides the user with the opportunity to review the captured fingerprints. As illustrated in FIG. 7D, the user interface 700d includes space to display pictures of the captured fingerprints 716, which for the convenience of the user may include multiple sizes or views. The user interface 700d displays text 720 for identifying each finger as well as a time and date when each fingerprint was captured 722. The user interface 700d, 700e displays visual and/or text indications 718 of which hand the user is currently reviewing. The user interface provides an option 724 for saving the fingerprints to the subject profile. The user interface also provides an option for restarting the fingerprint capture process 726.

FIGS. 8A-B are displays of a user interface 800a, 800b for capturing the immediate surroundings of the subject for use as a contextual (or "context") identifier, according to one embodiment. The surroundings of the subject may be captured as images using the imaging subsystem 130. In addition to including the surroundings of the subject, the context identifier may also subject identifying information such as tattoos, scars, marks, and objects the subject may have been carrying or wearing when the rest of the biometric identifiers were captured.

As illustrated in FIG. 8A, the user interface 800a for the capture of contextual identifiers includes an option 802 allowing the user to control the image capture. As illustrated in FIG. 8B, the user interface includes a display for reviewing captured context identifiers. Text is displayed identifying each captured contextual identifier as well as a time and date of capture 804. The user interface provides the option 806 of saving context identifiers to the subject's profile.

Figure 9A:
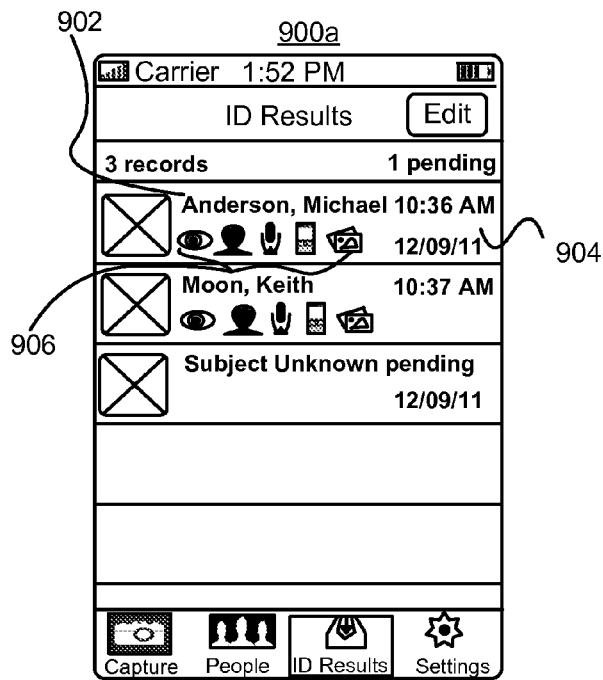
FIGS. 9A-B are displays of an example user interface for viewing the results of a match between a subject profile and other profiles.
Figure 9B:
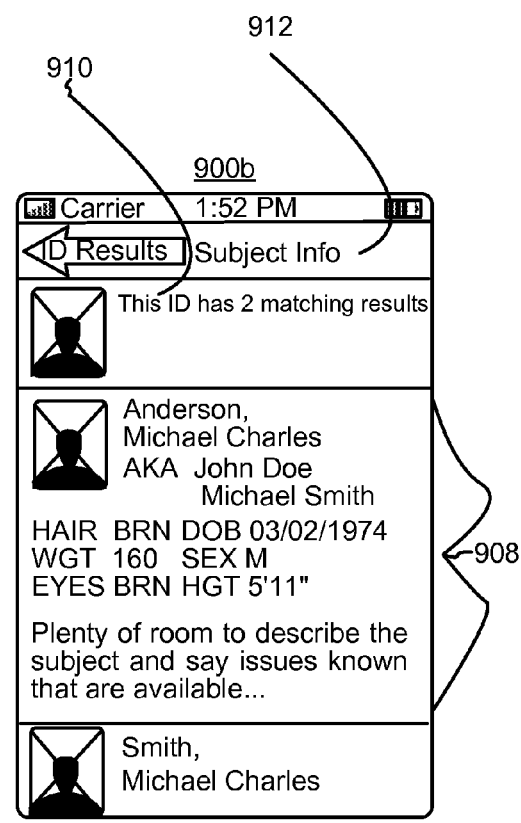

FIGS. 9A-B are displays of an example user interface 900a, 900b for viewing the results of a match between a subject profile and other subject profiles. These user interfaces 900a, 900b may be used as part of a an identification or access system that relies on matches between subject profiles as part of its functionality.

An example of an access system is where a subject profile is used to validate a subject for entry or access to something, for example entry into a building, access to a document, etc. An example of an identification system is a police or military system that determines whether a subject is a known person, according to records. Both of these kinds of systems compare a candidate subject profile against a database of other subject profiles, where the profiles may be stored locally in the database 114, or externally accessible through network adapter 115. The device 100 may be used to collect a candidate subject profile for comparison against other subject profiles. The device 100 may also be used to collect a subject profile in order to enroll a subject either of these types of systems.

The user interface 900a of FIG. 9A displays a list of subject profiles that have been captured and submitted for matching. The displayed listing may also include any item of information from the submitted subject profile, including, for example, the name of the subject 902, the time and date that the matching subject profile was created or edited 904, the types of biometric identifiers contained in the matching subject profile 906, as well as biographical information. If the number of submitted subject profiles fills the display 111, the user interface 900a allows the user to dynamically scroll (not shown) through the list. Selection of one of the submitted profiles causes the user interface 900a to display user interface 900a.

The user interface 900b of FIG. 9B displays a list of subject profiles that match the submitted subject profile. Similarly to user interface 900a, user interface 900b may include any item of information from the submitted subject profile including, for example, biographical information 908 for the matching subject.

If the listing contains more than one matching subject profile, the listing may be ranked and sorted by the degree to which the biometric identifiers of each matching subject profile match the candidate subject's biometric identifiers. Degree of matching may be determined based on the number of matching biometric identifiers. Degree of matching may also be determined based on the percent confidence that a given biometric identifier in a matching subject profile matches the corresponding biometric identifier from the candidate subject. The listing may also be sorted by any item of information in a subject profile.

If the number of matching subject profiles fills the display 111, the user interface 900b allows the user to dynamically scroll through the list. Separate from the scrollable list, the user interface 900b includes a static header 912 including at least some of the information from the selected submitted subject profile. The static header 912 does not move when the user scrolls through the list of matching subject profiles. This allows the user to compare the submitted subject profile and the returned matches at a glance without having to transition back to user interface 900a.

Additional Considerations

Some portions of above description describe the embodiments in terms of algorithms and symbolic representations of operations on information, or in terms of functions to be carried out by other components of the system. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. The described operations may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "determining" or the like, refer to the action and processes of a computer system, or similar electronic computing device, that manipulates and transforms data represented as physical (electronic) quantities within the computer system memories or registers or other such information storage, transmission or display devices.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method comprising:
displaying an iris capture user interface on a display of a mobile device, the user interface including a viewfinder graphically reconfigurable based on a relative position between the mobile device and a subject;
responsive to a motion of the mobile device, the motion indicating a change in the relative position between the mobile device and the subject:
updating the display of the user interface based on the motion, the updating comprising graphically reconfiguring the viewfinder based on the motion and the relative position between the mobile device and the subject;
determining that the subject is within a valid range for iris image capture by the mobile device;
activating a feedback subsystem of the mobile device indicating that the subject is within the valid range; and
capturing an iris image of the subject with the mobile device.

2. The method of claim 1 wherein the viewfinder comprises a reticle.

3. The method of claim 2 wherein responsive to the change in relative position increasing a distance between the mobile device and the subject, increasing a size of the reticle.

4. The method of claim 2 wherein responsive to the change in relative position decreasing a distance between the mobile device and the subject, decreasing a size of the reticle.

5. The method of claim 2 wherein responsive to the change in relative position causing the subject's irises to be misaligned with respect to the mobile device, reconfiguring the reticle to indicate a direction the mobile device should be moved to align the subject's irises with the mobile device.

6. The method of claim 1 wherein responsive to the mobile device being held sufficiently still for a threshold amount of time, capturing the iris image.

7. The method of claim 1 wherein the feedback subsystem is a vibration subsystem that when activated vibrates the mobile device.

8. The method of claim 1 wherein the feedback subsystem is a audio speaker subsystem that plays a sound when activated.

9. A non-transitory computer-readable medium storing executable computer program instructions for displaying on a display of a mobile device a right or left hand fingerprint capture user interface for capturing a plurality of fingerprint biometric identifiers of a subject, the user interface including:
a graphical representation of a hand, the graphical representation oriented so that a wrist of the graphical representation is displayed proximate to a top of the display, and a quintet of fingertips of the graphical representation are displayed proximate to a bottom of the display, the graphical representation matching a corresponding hand of the subject when the display faces away from a front of the subject; and a fingerprint capture graphical element for each finger of the graphical representation, each element graphically reconfigurable based on a fingerprint capture status of a finger of the subject.

10. The non-transitory computer-readable medium of claim 9 wherein the graphical element for each finger is displayed proximate to the fingertip of the graphical representation to which the graphical element corresponds.

11. A computer implemented method comprising:
displaying a right or left hand fingerprint capture user interface on a display of a mobile device, the user interface including:
 a quintet of fingerprint capture graphical elements disposed proximate to a bottom of the display,
 a wrist disposed proximate to a top of the display,
 the graphical representation matching a positioning of a corresponding hand of the subject when the display faces away from a front of the subject;
configuring an indicator subsystem in a first state indicating that the mobile device is prepared to receive a fingerprint input;
receiving the fingerprint input for a finger of the hand of the subject;
determining that the fingerprint input is valid;
configuring the indicator subsystem in a second state indicating that the fingerprint input is valid; and
updating the display of the user interface based on the fingerprint input, the updating comprising graphically reconfiguring the fingerprint capture graphical element corresponding to the fingerprint input.

12. The method of claim 11 wherein each fingerprint capture status may any one from the group consisting of a fingerprint validly captured status, a fingerprint not yet captured status, a fingerprint ineligible status, and a fingerprint capture order status.

13. The method of claim 11 wherein the user interface displays each different fingerprint capture status with a different graphic.

14. The method of claim 11 wherein the indicator subsystem comprises at least one or more of one or more lights and an audio speaker subsystem.

15. A portable, hand held biometric device, comprising:
a non-transitory computer-readable medium storing executable computer program instructions for capture of a plurality of fingerprint biometric identifiers of a subject and an iris biometric identifier of the subject, the instructions comprising a user interface to assist in the capture of the biometric identifiers of the subject;
a computing device configured to execute the instructions, the computing device comprising a display configured to display the user interface, the computing device configured to receive input from:
 a fingerprint capture subsystem configured to capture fingerprint biometric identifiers, the fingerprint capture subsystem including:
  a graphical representation of a hand, the graphical representation oriented so that a wrist of the graphical representation is displayed proximate to a top of the display, and a quintet of fingertips of the graphical representation are displayed proximate to a bottom of the display, the graphical representation matching a corresponding hand of the subject when the display faces away from a front of the subject; and
 an iris imaging subsystem configured to capture iris biometric identifiers.

* * * * *